United States Patent [19]

Desnijder et al.

[11] Patent Number: 4,897,071
[45] Date of Patent: Jan. 30, 1990

[54] COMBINE HARVESTER CLEANING APPARATUS

[75] Inventors: Dirk J. Desnijder, Gent; Wilfried E. D. Gunst, Koekelare; Willy C. Hollevoet, Torhout; Marc R. M. Jonckheere, Lichtervelde; Francois Van Herpe, Houtem, all of Belgium

[73] Assignee: Ford New Holland, Inc., New Holland, Pa.

[21] Appl. No.: 260,833

[22] Filed: Oct. 20, 1988

[51] Int. Cl.⁴ .................... A01F 12/44; A01F 19/00
[52] U.S. Cl. ...................................... 460/10; 460/101
[58] Field of Search .................. 460/1, 8, 9, 10, 90, 460/93, 97, 101

[56] References Cited

U.S. PATENT DOCUMENTS

| | | | |
|---|---|---|---|
| 2,189,706 | 2/1940 | Clipston | 460/10 |
| 2,382,965 | 8/1945 | Appel | 460/1 X |
| 2,500,448 | 3/1950 | Bozarth | 280/6.1 X |
| 3,412,735 | 11/1968 | Bichel et al. | 460/10 |

FOREIGN PATENT DOCUMENTS

| | | |
|---|---|---|
| 0087488 | 9/1983 | European Pat. Off. |
| 0178018 | 4/1986 | European Pat. Off. |
| 0212183 | 7/1986 | European Pat. Off. |
| 1929028 | 2/1971 | Fed. Rep. of Germany |
| 3427638 | 1/1986 | Fed. Rep. of Germany |
| 2328391 | 5/1977 | France |
| 1119630 | 10/1984 | U.S.S.R. |
| 1313802 | 4/1973 | United Kingdom |
| 2052238 | 1/1981 | United Kingdom |
| 2098446 | 11/1982 | United Kingdom |

Primary Examiner—Jerome W. Massie
Assistant Examiner—David J. Bagnell
Attorney, Agent, or Firm—Larry W. Miller; Frank A. Seemar; Darrell F. Marquette

[57] ABSTRACT

A combine harvester having a threshing and separating mechanism and a grain cleaning mechanism disposed beneath the threshing and separating mechanism and including a grain pan fitted with a movable divider apparatus and operable to receive grain from the threshing and separating mechanism, sieve mechanism operable to receive grain from the grain pan, and a fan operable to blow air through the sieve mechanism, is disclosed wherein an inclination sensing mechanism for sensing the lateral inclination of the combine harvester is operatively associated with an actuator operatively coupled to the grain pan divider apparatus for positionally adjusting the grain pan divider apparatus in response to the output of the inclination sensing mechanism to compensate for any given lateral inclination of the harvester. The sieve mechanism includes sieve sections pivotally mounted for lateral movement about respective fore-and-aft extending axes and operatively coupled to the actuator for positional adjustment thereof to effect a transverse leveling of the sieve mechanism when the combine harvester is laterally inclined.

23 Claims, 9 Drawing Sheets

COMBINE HARVESTER CLEANING APPARATUS

BACKGROUND OF THE INVENTION

This invention relates generally to combine harvesters and is more specifically concerned with the cleaning mechanisms of such machines.

In a combine harvester, the incoming crop material is threshed and separated in the threshing and separating mechanism and the separated grain falls onto a grain pan, together with a certain amount of foreign material such as chaff and dirt; the grain pan being located beneath the threshing and separating mechanism. The grain pan is reciprocated longitudinally of the machine and is arranged so that this reciprocation moves the material thereon progressively rearwardly whilst at the same time effecting initial separation into layers of the heavier grain kernels and the lighter straw, chaff and other foreign material. These layers are then transferred to an upper or chaffer sieve which is also reciprocated and through which air is blown so as to render airborne the lighter foreign material for discharge from the rear of the machine. The grain falls through the upper sieve to a lower sieve, which also is reciprocated and has air blown through it to remove any remaining foreign material. The clean grain then falls through the lower sieve to a clean grain trough from where it is conveyed to the grain tank. Any straw which remains on the upper sieve is discharged from the rear end thereof for subsequent discharge to the ground.

The terms "grain", "straw" and "tailings" are used principally throughout this specification for convenience and it should be understood that these terms are not intended to be limiting. Thus "grain" refers to that part of the crop material which is threshed and separated from the discardable part of the crop material which is referred to as "straw". Incompletely threshed ears are referred to as "tailings". These terms are used irrespective of the type of crop under consideration. Also terms such as "forward", "rearward", "left", "right", etc. used in connection with the combine harvester and/or components thereof are determined with reference to the direction of forward operative travel of the combine harvester but should not be considered as limiting.

The entire cleaning mechanism, including the grain pan, is highly critical to the loading thereof and operates most efficiently when the grain pan and sieves are loaded evenly, i.e. when they have a uniform layer of material thereon as seen across the transverse width thereof. It will be appreciated that this uniform loading is difficult to achieve in practice, in the absence of special steps, because firstly the layer of crop material fed to the threshing and separating means may of itself already be non-uniform which means that the threshed grain issuing therefrom is also non-uniformly distributed across the width of the cleaning apparatus and secondly, the loading of the cleaning apparatus is very susceptible to the sideways or lateral inclination of the machine. Thus, if a combine harvester is working on the side of a hill, the cleaning mechanism will tend to be heavily loaded at the lower side and lightly loaded, if at all, at the upper side. If the grain pan and sieves are divided into longitudinally-extending sections, then each section is mis-loaded in the same way.

In one known combine harvester illustrated in GB-A No. 2.052.238, the whole cleaning mechanism is pivotable about an axis extending longitudinally of the machine and the lateral inclination of the machine is sensed and the cleaning mechanism driven accordingly about the pivot axis so as to maintain the mechanism substantially horizontal at all time. This is an excellent solution to the problem but it is expensive.

In other combine harvesters such as exemplified in FR-A-No. 2.328.391 and GB-A-No. 1.313.802, the sieves are formed by a plurality of interconnected, longitudinally-extending sections, each of which is pivotable about a fore-and-aft axis of the machine, whereby it can be maintained substantially level, as seen in the transverse direction of the machine, irrespective of the lateral inclination of the machine. This has proved to be a valuable expedient in that, dependent upon the degree of lateral machine inclination, the capacity of a machine can be increased by up to 20% but does not provide a full solution to the problem.

In SU-A-No. 1.119.630 there is disclosed a combine harvester in which the grain pan is provided with movable deflectors or dividers which are operable to spread the grain uniformly over the pan. The deflectors are actuatable manually from a common drive mechanism which is not a practicable proposition in that the lateral inclination of a machine changes constantly and an operator cannot afford to stop the machine and adjust the grain pan deflectors each time it is necessary.

Accordingly, there is a need for an improved cleaning mechanism for a combine harvester which is less expensive than the entirely pivotable mechanism referred to above but which nevertheless effects a significant improvement in the cleaning capacity of the machine.

SUMMARY OF THE INVENTION

According to the invention, a combine harvester is provided having threshing and separating means and a cleaning mechanism disposed to receive threshed and separated crop material from the threshing and separating mechanism, wherein the cleaning mechanism includes a grain pan fitted with movable divider means, sieve means operable to receive crop material from the grain pan, fan means operable to blow cleaning air through the sieve means, inclination sensing means for sensing the lateral inclination of the combine harvester, and position control means operable to adjust the grain pan divider means in response to the output of the inclination sensing means.

Thus, the present invention provides a cleaning mechanism of which the grain pan is constantly adjusted for uniform loading irrespective of the lateral inclination of the machine, by way of movement of the grain pan divider means. The provision of these automatically and constantly adjusted grain pan divider means has been found to increase the capacity of a given combine harvester, dependent upon the degree of lateral machine inclination, by up to 35% which of itself is an acceptable improvement. However, it has been discovered that if adjustable grain pan divider means are employed in conjunction with sieve means which are arranged to be maintained substantially horizontal, as seen in the transverse direction of the machine, the capacity of a given machine may be increased, again dependent upon the degree of lateral machine inclination, by up to a staggering 100% and this combination represents a very significant advance in the art which was not in any way anticipated.

The references to percentage increases in the capacity of a given machine are to be construed in the sense of an increase in capacity for a given grain loss which is set by the operator as opposed to an increase in the absolute capacity of a machine. For example, an operator may decide to accept a grain loss of 0.5%, 1% or 2%, depending on the type and condition of the crop being harvested and this will determine the capacity in one mode of operation. It is an increase in this effective capacity to which reference is being made.

Accordingly, it is a preferred feature of the present invention to mount the sieve means such that they can be moved and thus maintained substantially horizontal as seen in the transverse directions of the machine. The sieve means may comprise an upper sieve and a lower sieve disposed generally the one above the other. The upper sieve preferably comprises a plurality of interconnected sections extending generally fore-and-aft of the machine and pivotable about fore-and-aft extending axes; said sieve sections being actuatable so as to be maintained generally horizontal as seen in said transverse direction of the machine.

The inclination sensing means used to control the grain pan divider means may also be used to control the sieve means in general or the upper sieve sections in particular. Preferably the position control means is in the form of a single actuator means which is used to effect the necessary adjustment of both the divider means and the sieve means as the lateral inclination of the machine changes. The common actuator means may be mounted on the grain pan and may be in the form of an electric motor or a linear actuator, for example, which drives the grain pan divider means and sieve means via mechanical linkages.

The sensing means may be in the form of an inclination sensor of the pendulous type and which is preferably arranged in a closed loop with the actuator means, whereby the latter supplies a feedback signal to the former. The grain pan divider means may comprise one or more dividers which are preferably pivotally attached to the grain pan at or towards the rear end thereof (e.g. at the two thirds of the length) and which are driven from a location at or towards the front end of the grain pan (e.g. at one third of the length of the grain pan).

BRIEF DESCRIPTION OF THE DRAWINGS

A combine harvester embodying the present invention will now be described in greater detail, by way of example, with reference to the accompanying drawings, wherein.

DETAILED DESCRIPTION OF THE PREFERRED EMBODIMENT

Figure 1:
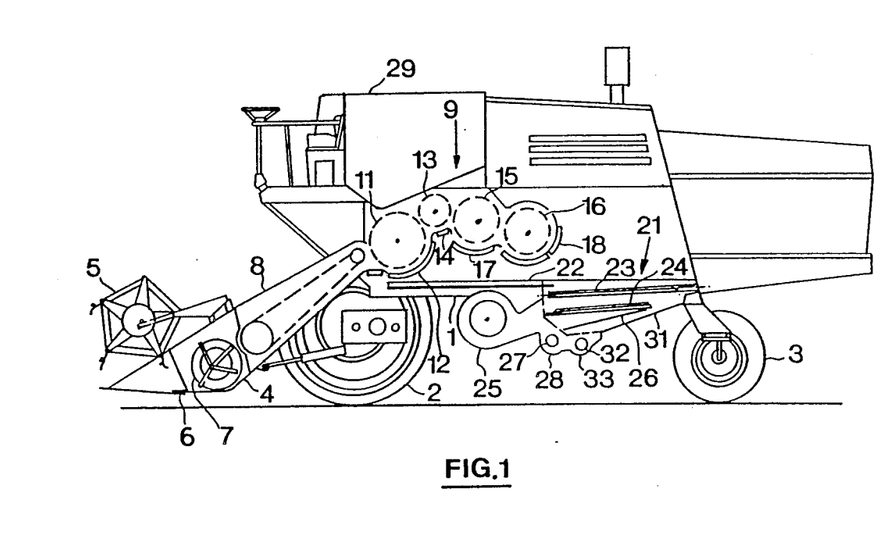
FIG. 1 is a diagrammatic side elevational view of the combine harvester.

Referring first to FIG. 1, the combine harvester illustrated is of a known rotary design employing rotary separating means and, as such, the components thereof are well known. However, the invention is equally applicable to the so-called conventional combine harvesters employing straw walkers for separating grain from the straw.

For ease of reference, a brief general description of the combine harvester shown in FIG. 1 will be given. This combine harvester comprises a main body 1 supported on a front pair of traction wheels 2 and a rear pair of steerable wheels 3. This combine harvester comprises a header 4 having a reel 5 which sweeps crop material to the cutterbar 6. Cut crop material is consolidated centrally of the machine by an auger 7 and then elevated by an elevator 8 to threshing and separating means indicated generally at 9 and basically consisting of a threshing section including a threshing cylinder 11 cooperable with a threshing concave 12, a straw beater 13 and associated beater grate 14 and a separating section including two separator rotors 15,16 cooperable with associated separator grates 17,18. Most of the grain is separated from the straw by the threshing cylinder 11 and associated threshing concave 12. Straw material issuing from the threshing means 11,12 is subjected to the action of the straw beater 13 and passes therefrom to the separating means 15-18 which effect further separation of grain from the remainder of the crop material.

Grain which is separated by the threshing and separating means 9 falls onto the grain pan 22 of a cleaning apparatus 21 which further also comprises a pair of sieves 23, 24 disposed the one above the other and a cleaning fan 25. The grain pan 22 and the sieves 23, 24 are oscillated generally back-and-forth for transporting threshed and separated grain from the grain pan 22 to the cleaning sieves 23, 24 on the one hand and for moving said grain along said sieves 23, 24 while permitting the passage of cleaned grain by gravity through these sieves 23, 24 on the other hand. The grain on the sieves 23, 24 is subjected to a cleaning action by the fan 25 which serves to blow air through said sieves 23, 24 to remove chaff and other impurities, such as dust, from the grain by making this material airborne for discharge from the machine. Clean grain eventually falls to a clean grain collecting pan 26 beneath the lower sieve 24 and which leads this clean grain to a clean grain auger 27 in a clean grain auger trough 28 from where it subsequently is transferred to a grain tank 29. Tailings eventually fall to a tailings collecting pan 31 beneath the clean grain collecting pan 26 and which leads these tailings to a tailings auger 32 in a tailing auger trough 33 from where they are recycled through the threshing and separating means 9 for renewed threshing and separating action.

Figure 5:
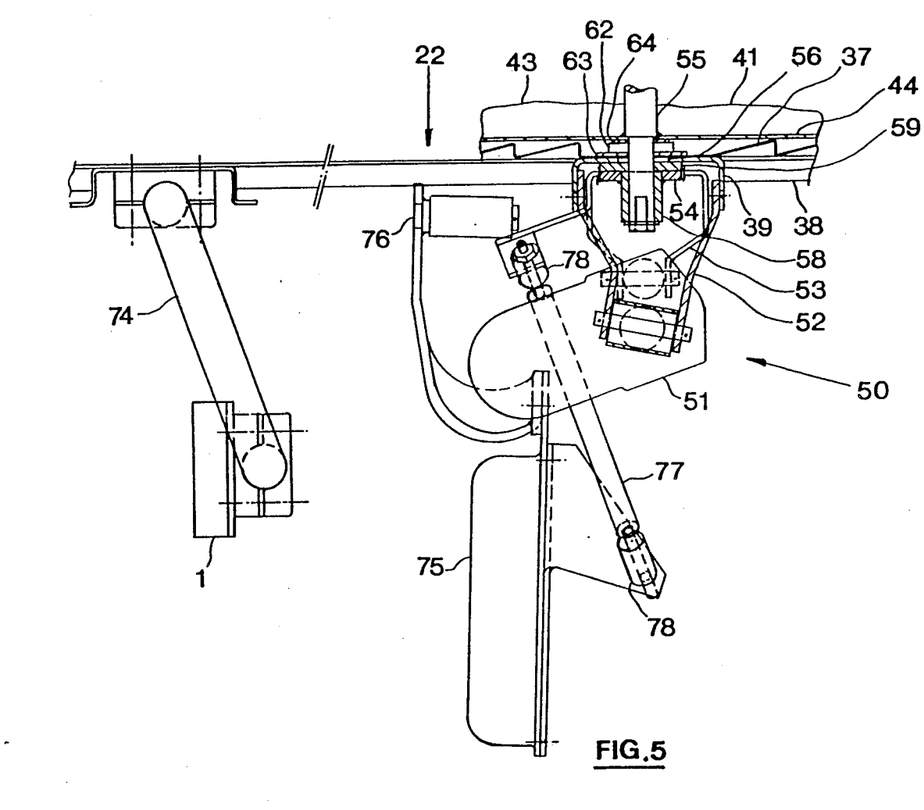
FIG. 5 is a cross-sectional view taken along line V—V of FIG. 4.
Figure 6:
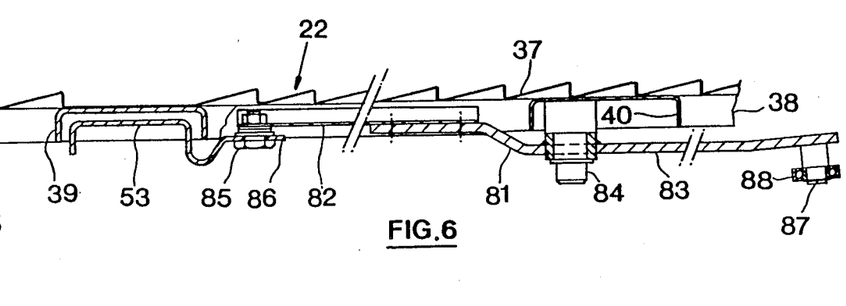
FIG. 6 is a cross-sectional view taken along line VI—VI of FIG. 3.
Figure 7:
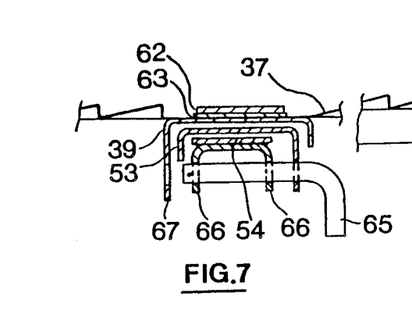
FIG. 7 is a cross-sectional view taken along line VII—VII of FIG. 4.

Typically the cleaning apparatus 21 also comprises an upper cleaning shoe 35 (FIGS. 9, 11 and 12) and a lower cleaning shoe which are mounted on the main body 1 of the combine harvester through the intermediary of mounting arms (only one arm 74 for mounting the grain pan 22 on the main frame 1 is shown in FIG. 5) for opposite oscillatory movement in the general fore-and-aft direction. The upper cleaning shoe 35 is arranged to removably mount therein the afore-mentioned grain pan 22 and the upper cleaning sieve (chaffer sieve) 23 so that said grain pan 22 and said chaffer sieve 23 are oscillated in unison in said direction. The lower cleaning shoe is arranged to removably mount therein the lower cleaning sieve 24 and further also comprises the aforementioned clean grain and tailings collecting pans 26 and 31. The cleaning sieves 23, 24 usually are disposed the one above the other and are inclined slightly upwardly from front to rear of the machine. The "mesh" of each one of the sieves 23, 24 may be provided by a plurality of transverse louvres 36 (only schematically shown in FIGS. 2 and 9) each stamped out of sheet metal and having a main body portion, rearwardly extending fingers and a forwardly extending portion which is angled down-wardly with respect to the main body portion. The louvres 36 are juxtaposed such that the fingers of one overlie the body portion and forward portion of the next louvre 36, hence forming a "mesh" through which clean grain may fall. The "meshes" of the sieves 23, 24 are adjustable independently of each other so as to adapt them to the crop which is being harvested. While the sieves 23, 24 as described above are of the adjustable type, one or both may be replaced by "fixed" sieves having an invariable "mesh".

The grain pan 22 comprises a corrugated floor 37, as is conventional, and is provided with deflector or divider means consisting of e.g. four individual, transversely spaced apart deflectors or dividers 41, each in the form of a generally upright slat extending lengthwise of the grain pan 22 for dividing this grain pan 22 in side-by-side extending sections adapted to hold threshed an separated grain therein as it is conveyed rearwardly toward the cleaning sieves 23, 24. Similar divider or deflector means may be provided on the cleaning sieves 23, 24 but are omitted in FIG. 2 for the sake of clarity.

The cleaning apparatus 21 described so far is conventional whereby the basic structure and operation thereof need not be described in any further detail. Turning now to FIGS. 2 to 13, the grain pan 22 and the upper sieve 23 will be described in further detail as regards the features of the present invention.

Turning specifically to FIGS. 2 to 7, the grain pan 22 first will be described in further detail. This grain pan 22 basically consists of a rectangular subframe 38 to which is welded the aforementioned corrugated floor 37 and which comprises transverse inverted U-shaped reinforcing beams 39, 40 disposed below the corrugated floor 37 generally at one third and two thirds of the length of the grain pan 22. The dividers or deflectors 41 are positioned above the corrugated floor 37 and have forward sections which taper in height toward the front of the grain pan 22 and which are fish-back shaped rearwardly of said tapering forward sections. It will be seen that the deflectors or dividers 41 are extended so as to overlap the front end of the upper sieve 23 and that the rear end of the grain pan 22 is provided with sets of fingers 48 between and beneath the deflectors 41; these fingers 48 being conventional and assisting in transferring grain from the grain pan 22 to the upper sieve 23.

Each divider 41 is pivotally mounted on the grain pan 22 by a pivot 42 generally perpendicular to the plane of the grain pan 22 and mounted on the rear transverse beam 40. Position control means 50 are coupled between the dividers 41 and the forward transverse beam 39.

The dividers 41 need to be of comparatively rigid construction in order to be able to act upon the grain which is on the grain pan 22. Furthermore, the bottom edges of the dividers 41 which engage the upper surface of the grain pan 22, need to do so in a "sealed" manner in order that grain and dirt cannot lodge between these two components in a manner to cause jamming. To this end, each divider 41 is made in the form of a hollow member made up of two formed plates 43 which are turned outwardly at the bottom edge of the divider and to which is welded a horizontal plate 44. These horizontal plates 44 engage the upper surface of the grain pan 22 and thus serve to wipe or scrape the grain pan floor 37 so as to minimize the risk of grain and dirt becoming jammed beneath the dividers 41.

Apart from having to cope with the weight of the material on the grain pan floor 37 at any given instant, the dividers 41 also have to have a structural strength sufficient to be able to handle all crop conditions. For example, some crops, such as corn, are harvested in very humid conditions so that dirt tends to stick to the grain pan floor 37 and can be quite difficult to move. This is especially so if winter conditions apply in as much as the crop material can become frozen and thereby dirt can stick even more firmly to the grain pan floor 37. One of the formed plates 43 of each divider 41 projects above the other formed plate 43 thereof and is shaped to form the aforementioned "fish-back"/configuration.

Each pivot 42 is formed by a pivot pin 45 which is secured to the corresponding divider 41 between the shaped side walls 43 thereof and which projects downwardly through an aperture in the grain pan floor 37 and the rearward transverse beam 40. The lower end of each pivot pin 45 is received in a rubber bushing 46 which itself is clamped in a mounting member 47 secured to the underside of the rear transverse beam 40; this rubber bushing 46 permitting limited pivotal movement of the pivot pins 45 as is known in the art.

With particular reference to FIGS. 4 to 7, the position control means 50 now will be described in more detail. This position control means 50 comprises a linear actuator 51 which is mounted onto the grain pan 22 at the underside thereof. It should be noted that, as already mentioned, the grain pan 22 is reciprocated so as to move the crop material thereon rearwardly of the machine for subsequent transfer to the upper sieve 23. Thus, the actuator 51 is oscillating with the grain pan 22 which is a distinct advantage as opposed to mounting the actuator 51 on the body of the machine and then providing a relatively complex linkage to the grain pan 22 in order to take account of the oscillatory movement of the latter. All that is required is a feedback loop between the actuator 51 and the inclinometer 75 controlling the actuator 51 and as will be described in detail furtheron.

This linear actuator 51 is pivotally coupled at one end to a mounting lug 52 secured to the forward transverse beam 39 of the grain pan 22 and at its other end to an inverted, generally U-shaped shuttle member 53 which is guided for transverse back-and-forth movement relative to the transverse forward beam 39. This shuttle member 53 is supported relative to the forward transverse beam 39 by a transverse coupling bar 54 which itself is pivotally coupled to all four dividers 41 through the intermediary of coupling pins 55. Said coupling pins 55 are similar to the pivot pins 45 and are secured to the respective dividers 41 in the same manner as said pivot pins 45. The coupling pins 55 project downwardly through elongated, transversely oriented slots 56 in the grain pan floor 37.

Two of said coupling pins 55 also extend through elongated, transversely oriented slots 57 in the base member of the U-shaped shuttle 53. The shuttle 53 thus is "sandwiched" between the underside of the grain pan 22 and the coupling bar 54. The coupling pins 55 are received through the intermediary of sleeve bearings in bearing means 58 secured to the underside of the aforementioned transverse coupling bar 54 thus permitting a limited pivotal movement of said pins 55 relative to said bar 54 during adjustment of the dividers 41. From what precedes, it thus will be clear that all four dividers 41 are coupled to each other for angular adjustment in unison. Washers 59 of synthetic material are provided coaxially with the pins 55 between the shuttle member 53, respectively the coupling bar 54 and the transverse beam 39. Further washers 61 of synthetic material equally are provided coaxially with the pins 55 and between the shuttle member 53 and the coupling bar 54. These synthetic washers prevent metal-to-metal contact between the various components and facilitate relative movement therebetween.

The grain pan floor 37 is provided with a flattened, i.e. non-corrugated section which extends transversely at the location of the coupling pins 55. This is intended to facilitate an effective sealing of the elongated slots 56 in the floor 37 through which the pins 55 project. This sealing is provided by a transverse sealing bar 62 having four circular apertures adapted to pivotally receive the coupling pins 55 therethrough. This sealing bar 62 is "sandwiched" between the dividers 41 and the top of the grain pan floor 37 along said transverse flattened section and is held in place by the pins 55 thus closing off the elongated slots 56 in the floor 37. During adjustment of the dividers 41, the sealing bar 62 is shifted in the one or other transverse direction in unison with said dividers 41. To avoid metal-to-metal sliding contact, a plate 63 of synthetic material is inserted between the sealing bar 62 and the top of the grain pan floor 37. Washers 64 of synthetic material equally may be inserted between the sealing bar 62 and the respective dividers 41 coaxially with the respective coupling pins 55.

From what precedes, it will be appreciated that an energizing of the linear actuator 51 causes a transverse sliding movement of the shuttle 53 relative to the coupling bar 54 and the transverse beam 39. To ensure that this movement is transferred to the dividers 41 for obtaining angular adjustment thereof around the pivot pins 45, a coupling between the shuttle 53 and the coupling bar 54 still should be established. This is obtained by inserting a coupling pin 65 through apertures in the shuttle member 53 and lugs 66 attached to the coupling bar 54. Should angular adjustment of the dividers 41 either not be necessary or not be possible, then the coupling pin 65 may be removed from the shuttle member 53 and be repositioned between the lugs 66 on the coupling bar 54 and a further lug 67 on the transverse beam 39 to thereby firmly lock the dividers 41 in their "neutral" or central position relative to the grain pan 22. In this condition, actuation of the linear actuator 51 merely results in a transverse shifting movement of the shuttle 53.

Figure 14:
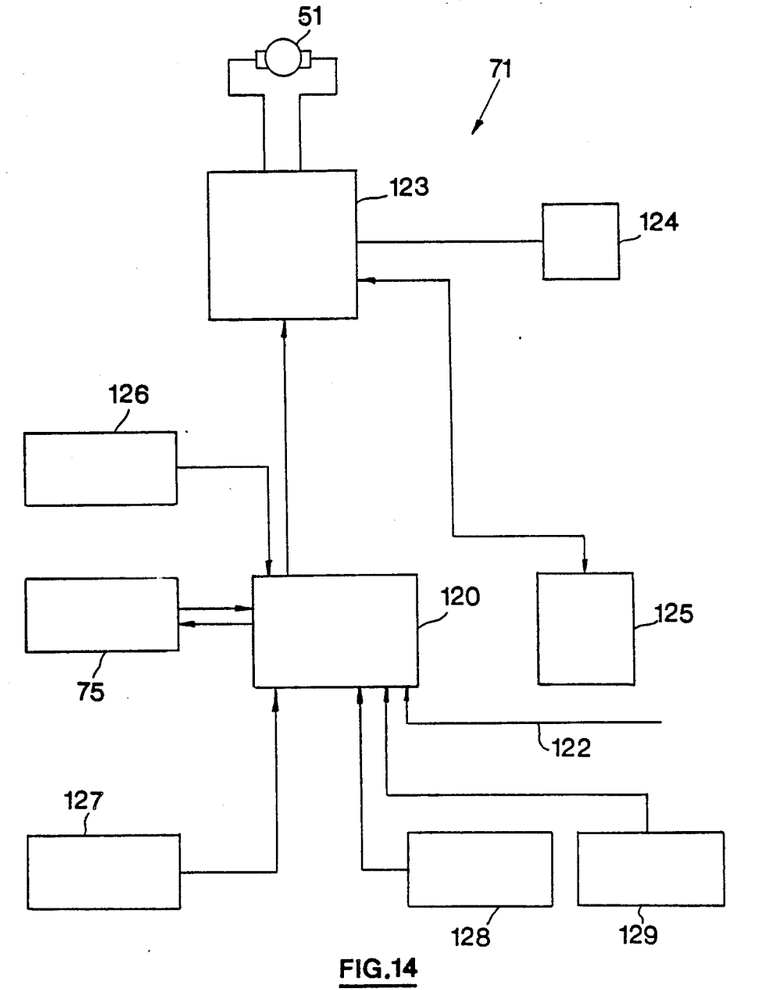
FIG. 14 is a schematic diagram illustrating the electrical circuitry of the cleaning mechanism according to the invention.

The shuttle member 53 has a lip 68 disposed to actuate opposite electrical end-of-stroke switches 126 mounted on the grain pan 22 and included in an electrical control circuit 71 for the linear actuator 51 and which is schematically illustrated in FIG. 14. The end-of-stroke switches 126, when actuated by the shuttle member 53, interrupt the power supply to the linear actuator 51 to thereby limit the angular displacement of the dividers 41 in the one or other direction.

An inclination sensor 75 in the form of a pendulous device, is mounted on the main frame 1 of the combine harvester for pivotal movement about a fore-and-aft extending pivot 76 and is operable to produce an electrical output signal which is indicative of the lateral inclination of the sensor and which is used to control the linear actuator 51. A mechanical linkage 77 connects the body of the sensor 75 to the shuttle 53 in a manner so that, as the linear actuator 51 extends or contracts in accordance with the sense of the output signal from the sensor 75 generated when this sensor 75 assumes an inclined position, the body of said sensor 75 is returned to the vertical position whereafter further extension or contraction of the actuator 51 is interrupted.

In other words, the linkage 77 effects feedback from the actuator 51 to the sensor 75, thus closing the loop between these two components. This type of closed loop, inclination dependant control mechanism is generally known in the art and, during operation, always tends to compensate for any deviation of the sensor 75 from the vertical orientation by energizing the actuator 51 for returning said sensor 75, through the intermediary of the feedback linkage 77, to the vertical orientation. Simultaneously with this resetting to the vertical of the sensor 75, the actuator 51 also adjusts the angular position of the dividers 41 by virtue of the actuator 51 also being coupled to these dividers through the intermediary of a.o. the shuttle member 53. This feedback arrangement ensures that adjustment of the dividers 41 is effected smoothly and that there is no hunting about the required adjusted position due to overshoot of the actuator 51 which otherwise would occur without any feedback control.

A similar inclination dependant control mechanism is shown and described in GB-A-No. 2.098.446, wherein however, the feedback is of the electromechanical type while that in the embodiment of the present invention a purely mechanical feedback coupling is utilized. This purely mechanical feedback coupling is relatively inexpensive to realize and has become possible by taking special precautions to avoid that the oscillatory movement of the grain pan 22, and thus also of the actuator 51 mounted thereon, would be transmitted to the sensor 75 to any noticeable and disturbing degree. It indeed should be kept in mind that, while the sensor 75 is pivotally mounted on the combine harvester main body 1, the actuator 51 and the shuttle member 53 are mounted on the grain pan 22 which, in operation of the harvester, constantly is oscillated in the fore-and-aft direction. This oscillatory movement should not be transmitted to the sensor 75 as this would adversely affect the operation of the inclination sensitive control mechanism.

To this end a combination of measures has been taken. Firstly, the feedback linkage 77 has been made relatively long in comparison with the stroke of the grain pan 22 whereby any transverse displacement of the sensor 75 as a result of the oscillation of the grain pan 22 with the actuator 51 and the shuttle 53 thereon in the longitudinal direction, is minimal. Secondly, the fore-and-aft orientation (i.e. the angular position as seen in side view) of the feedback linkage 77 is generally parallel to the fore-and-aft orientation of the suspension arms 74 mounting the grain pan on the main body 1 of the combine harvester for said oscillatory movement. In other words, the projections of the grain pan suspension arms 74 and of the feedback linkage 77 on the plane of oscillation of the grain pan 22 (i.e. a vertical fore-and-aft plane) are parallel to each other. Thirdly, the linkage 77 includes spaced apart shock absorbing rubber couplings 78. The end result of all these precautions is that the oscillatory movement of the grainpan 22 in the fore-and-aft direction for transporting crop material thereon, does not cause the inclination sensor 75 to generate any output signal as is desirable. Yet, this feedback system is a very simple mechanism. However, this aspect could be simplified even further by providing an electrical feedback from the actuator 51 to the inclinometer 75.

It further will be appreciated that other types of feedback couplings also could cope with this particular problem presented by the fore-and-aft oscillatory movement of the grain pan 22. As an example thereof, a Bowden type feedback coupling may be mentioned.

The inclination dependant control mechanism 50 not only should be able to control the angular position of the dividers 41 on the grain pan 22 but further also should be able to adjust at least the upper cleaning sieve 23 in response to the lateral inclination of the machine. To this end, a coupling linkage 81 is pivotally mounted at a pivot 84 on the rear transverse beam 40 of the grain pan 22 and has a first arm 82 which extends generally forwardly and which is pivotally coupled at 85 to a lip 86 on the shuttle member 53. A second arm 83 extends rearwardly from the pivotal mounting 84 and has a coupling pin 87 generally at its rearward end; said coupling pin 87 carrying a roller bearing 88. This coupling pin 87 and roller bearing 88 form part of a bypass coupling 89 which will be described in detail furtheron.

Turning now to the FIGS. 9 to 13, the upper sieve 23 will be described in more detail. This upper sieve 23 comprises a generally rectangular main frame 91 including front and rear transverse beams 92, 93 upon which a plurality of sieve sections 94 (preferably five) pivotally are mounted. The upper sieve 23 is removably mounted as a unit in the upper cleaning shoe 35 and can be removed therefrom generally in a rearward direction. When installed, the forward transverse beam 92 of the main sieve frame 91 is received in a transversely extending seat 95 of the upper cleaning shoe 35.

Each sieve section 94 consists of an elongated, generally rectangular subframe 96 having fore-and-aft side members 97 and front and rear transverse members 98. The sieve elements are formed by a plurality of overlapping and adjustable louvres 36 which are pivotally mounted between the pairs of fore-and-aft subframe members 97 in a conventional manner. A conventional sieve adjustment mechanism (not shown) is mounted on the rear transverse subframe member 98 of each sieve section 94 and is coupled in a conventional manner to the various louvres 36 for permitting adjustment of the sieve "mesh". To the extent that these components of the cleaning sieve 23 are conventional, there is no need for a further detailed description thereof.

All sieve sections 94 have fore-and-aft extending pivot pins 101 coupled to the forward and rearward transverse subframe members 98 and which are pivotally received in the front, respectively on the rear transverse beams 92, 93 of the main frame 91 of the upper sieve 23 in a manner to permit pivotal movement of said sieve sections 94 around respective fore-and-aft axes.

Each sieve section 94 comprises at its forward end an upstanding lug 102 connected to the forward transverse subframe member 98. Each said lug 102 pivotally receives at its upper end a pivot pin 103 of a common transverse coupling bar 104. It thus will be appreciated that all five sieve sections 94 are coupled to each other through the intermediary of said coupling bar 104 for pivotal adjustment in unison about their respective fore-and-aft pivot axes. Pivotal adjustment of said sections 94 is accomplished by a lateral displacement of the coupling bar 104 in the one or other direction.

An arcuately shaped leaf spring 111 is fixedly coupled at one of its ends to the aforementioned coupling bar 104, extends generally transversely of the machine and has a coupling seat 112 adjacent its other end. When the upper sieve 23 is installed in position within the machine, the aforementioned coupling seat 112 is positioned for receiving therein the roller bearing 88 mounted on the coupling pin 87 of the coupling linkage 81. This leafspring arrangement together with said roller bearing 88 thus forms the bypass coupling 89 already referred to herebefore.

When the upper sieve 23 is installed in position in the upper cleaning shoe 35, there is an overlap between the rear end of the grain pan 22 and the forward end of the upper cleaning sieve 23 whereby the bypass coupling 89 and associated components are shielded from the crop material passing, in operation, from the grain pan 22 to the upper sieve 23. Thus the various components forming part of, or associated with the aforementioned bypass coupling 89, including further also the coupling bar 104 and the lugs 102, cannot give rise to plugging with crop material.

It will be appreciated from what precedes that, when the bypass coupling 89 is engaged and when the actuator 51 underneath the grain pan 22 is extended or contracted in response to an output signal generated by the inclinometer 75, the shuttle member 53 is shifted transversely in the one or other direction whereby, consequently the sieve sections 94 are pivoted in unison around their respective pivot axes through the intermediary of the coupling linkage 81, the bypass coupling 89 and the coupling bar 104. This operation of the linear actuator 51 also results, as already explained, in an angular adjustment of the dividers 41 associated with the grain pan 22 on condition that the shuttle member 53 in coupled to the coupling bar 54 through the intermediary of the coupling pin 65. Thus, the one position control means 50 provided on the underside of the grain pan 22 is operable, when during operation, the lateral attitude of the combine harvester varies, both to maintain the sieve sections 94 of the upper sieve 23 generally horizontally as seen in the transverse direction and to pivot the dividers 41 associted with the grain pan 22 in a plane parallel to said grain pan 22 to thereby compensate for the negative influence of the sideward inclination of the harvester on the crop material distribution on the grain pan 22.

Figures 8, 10, 12, 13:
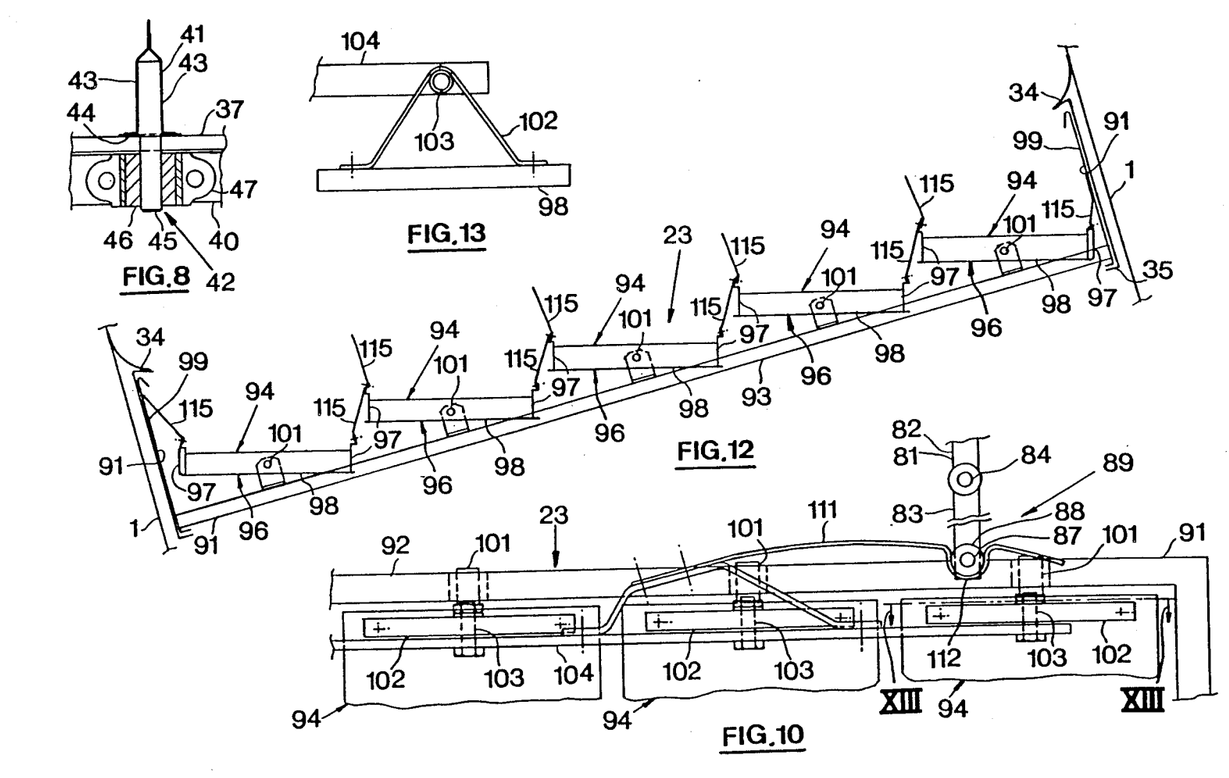
FIG. 8 is a cross-sectional view taken along line VIII—VIII of FIG. 3.
FIG. 10 is a cross sectional view taken along line line X—X of FIG. 9.
FIG. 12 is a view similar to that of FIG. 11, but showing the upper sieve components in an adjusted position.
FIG. 13 is a cross-sectional view taken along line XIII—XIII of FIG. 10.
Figure 11:
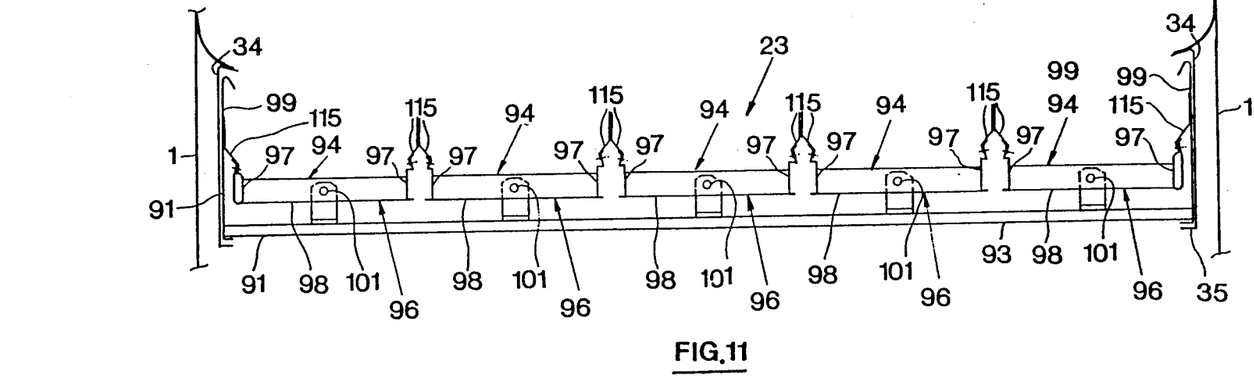
FIG. 11 is a schematic end view of the upper sieve corresponding to line XI—XI of FIG. 9.

From FIGS. 11 and 12 it will be seen that the junctions between the respective sieve sections 94 and the side members 99 of the main frame of the sieve 23 are sealed by flexible strips 115 attached to the subframe side members 97. The sealing strips 115 like the subframe side members 97 extend the full length of each of the sieve sections 94. In the "neutral", non-adjusted or central position of the upper sieve 23, which is adopted when the machine is operating on level terrain and which is illustrated in FIG. 11, the free edges of adjacent pairs of flexible strips 115 co-operate to effect the required sealing at the junctions between the sieve sections 94. The flexible strips 115 at the extreme sides of the upper sieve 23 cooperate with the main frame side members 99 which are disposed inside the upper cleaning shoe side walls 34 which are of a slightly greater height. The aforementioned pairs of cooperating flexible strips 115 also effectively function as fore-and-aft dividers for maintaining crop material upon the respective sieve sections 94. In other words, these dividers prevent crop material from shifting from one sieve section 94 to an adjacent sieve section 94 as it progresses therealong during operation.

Figure 2:
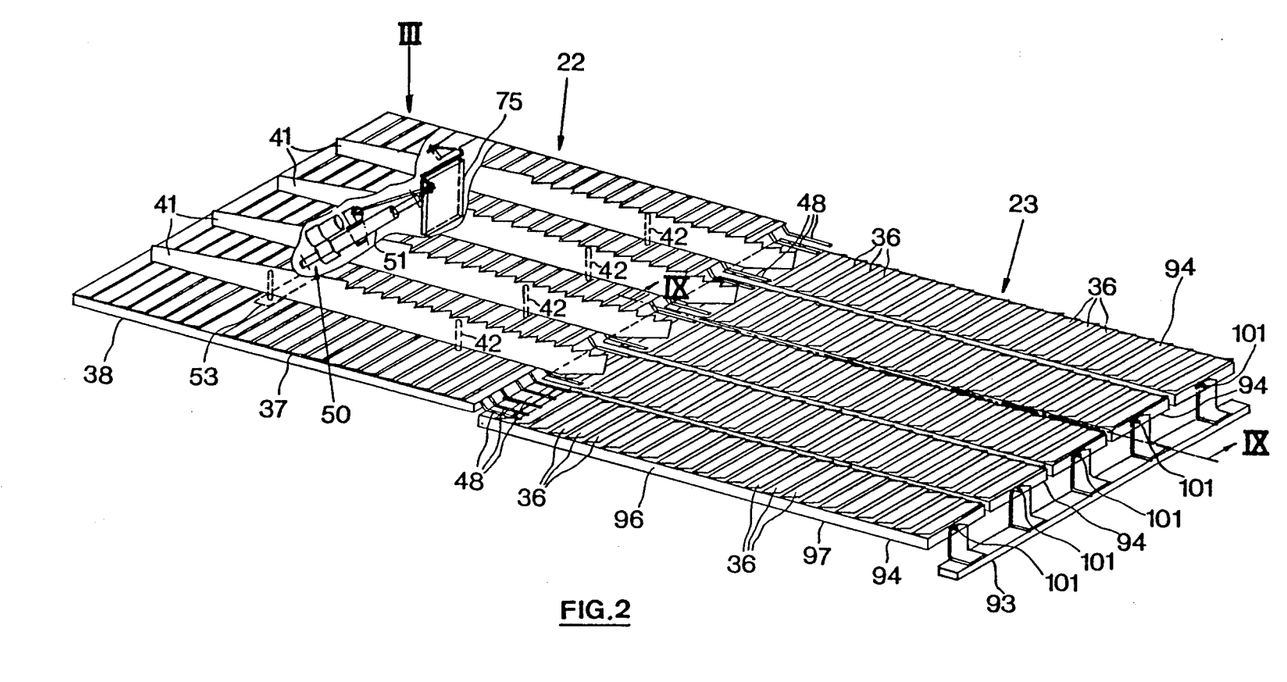
FIG. 2 is a diagrammatic perspective view of part of the grain cleaning mechanism of the machine of FIG. 1 and illustrating the grain pan and the upper sieve.
Figure 3:
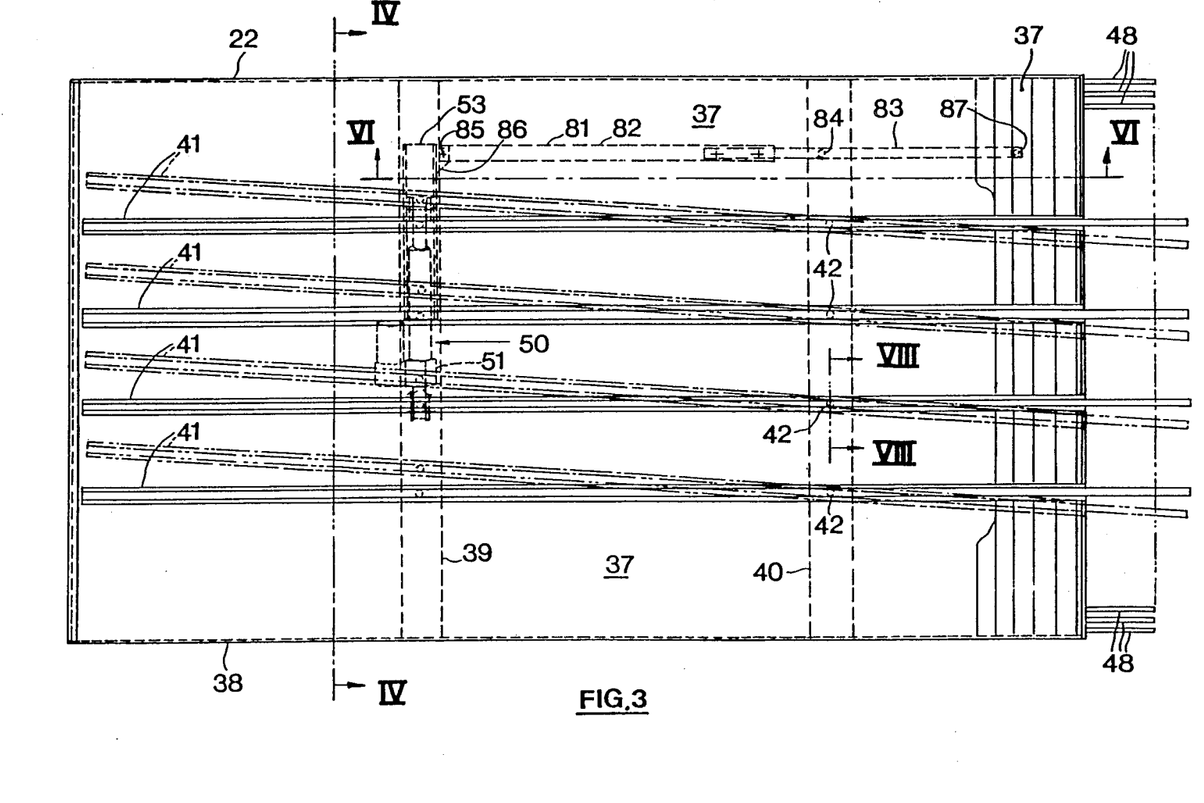
FIG. 3 is an enlarged schematic plan view of part of FIG. 2 and illustrating parts thereof in phantom lines in an adjusted position.
Figure 4:
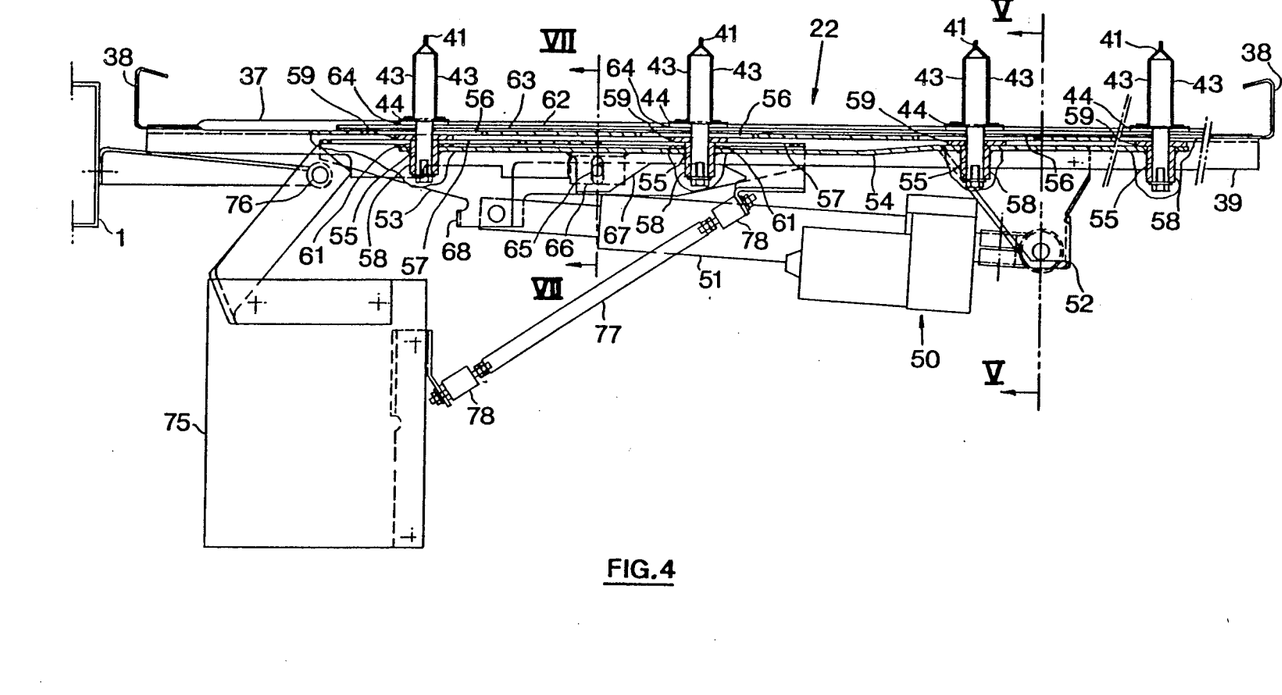
FIG. 4 is a cross-sectional view taken along line IV—IV of FIG. 3.
Figure 9:
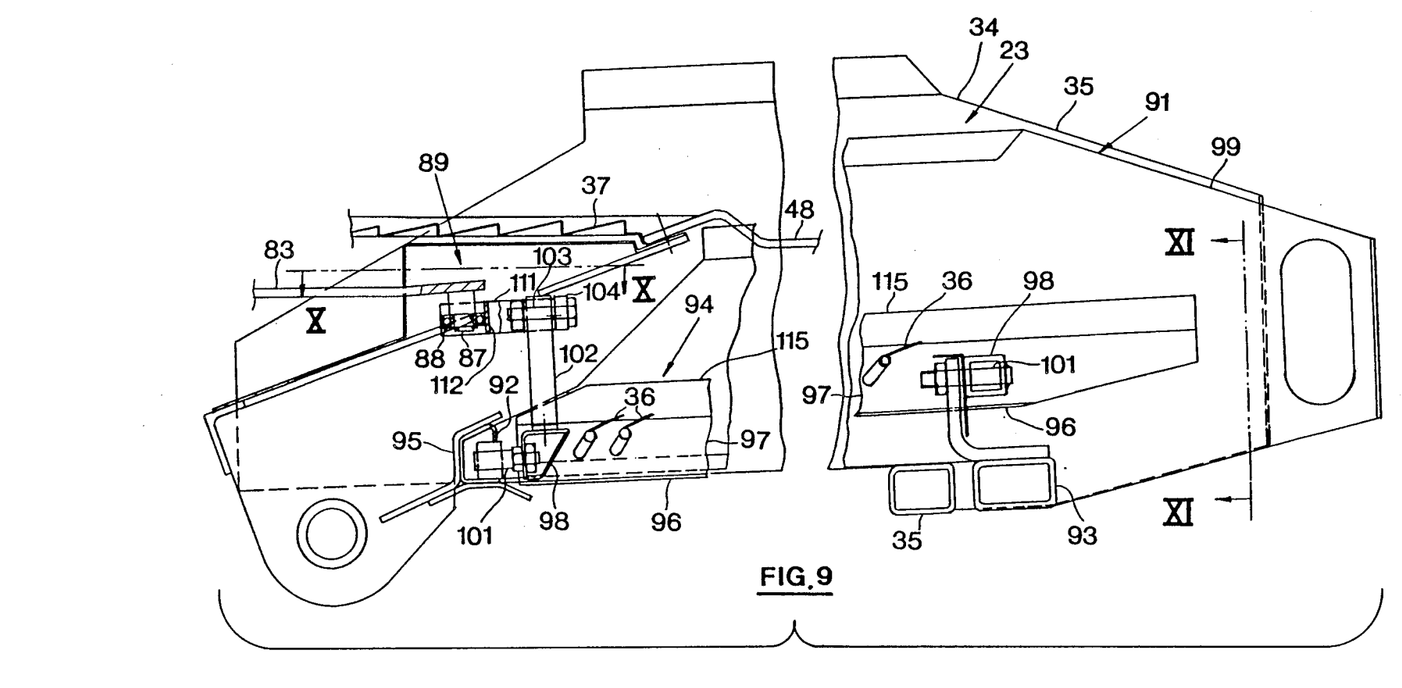
FIG. 9 is a fragmentary cross-sectional view taken along the line IX—IX of FIG. 3 and illustrating details of the upper sieve.

When the sieve 23 is in an adjusted position such as shown in FIG. 12 of the drawings, then the various sieve sections 94, while positioned generally horizontally, are vertically staggered the one relative to the other. In such an adjusted position, the junction between two adjacent sieve sections 94 is sealed by a flexible strip 115 of the lower section 94 engaging with the adjacent subframe side member 97 of the higher sieve section 94. The flexible strip 115 supported by said subframe side member 97 does not engage any other part but still acts as a divider member as already explaned. The highermost sieve section 94 has an outer flexible strip 115 which continues to sealingly cooperate with the adjacent main frame side member 99 while that the lowermost sieve section 94 has an outer flexible strip 115 which eventually cooperates with a turned over edge of the adjacent mainframe side member 99 to equally seal off the opening therebetween. Accordingly, grain can only pass through the upper sieve 23 via the conventional louvres 36 which are best seen in FIGS. 2 and 9 of the drawings.

It will be appreciated from what precedes that, if during the self-levelling operation of the upper cleaning sieve 23 as described above the one or other sieve section is prevented to pivot, as is required, because of any possible reason such as e.g. a corn cob obstructing such pivotal movement, then this will not result in the mechanism becoming damaged. Instead, the bypass coupling 89 will become disengaged by virtue of the leaf spring 111 being deflected towards the coupling bar 104 upon which it is mounted and thus permitting the roller bearing 88 to leave the seat 112 in the leaf spring 111. When this occurs, then, of course the sieve sections 94 temporarily will not return to the horizontal position.

When the lateral inclination of the combine harvester subsequently changes in the other direction, the roller bearing 88 will re-engage the seat 112 in the leaf spring 111 and thus pivot the sieve sections 94 in the other direction opposite to the direction which previously was made impossible. Consequently the movement obstructing element (corn cob or other) normally will become loose and be discharged by virtue of the oscillatory movement of the cleaning sieve 23. Thus, if pivotal movement of any one of the sieve sections 94 is prevented, the bypass coupling 89 automatically disengages thus avoiding damage being caused to anyone of the various components and subsequently atomatically is re-engaged when the self-levelling mechanism requires the sieve sections 94 to pivot in the opposite direction whereby the cause of the previous bypass coupling disengagement normally is removed and thus the self-levelling is automatically restored in its normal operative condition.

Another remarkable advantage of the present invention resides in the ease of assembly of the upper sieve 23. This upper sieve 23 with the sieve sections 94 is formed as a subassembly which further also comprises the lugs 102, the coupling bar 104 and the leaf spring 111, and which can be assembled into and removed from the machine as a single unit without having to use any tools to couple the position control means 50 to this sieve 23. In other words, when assembling the sieve 23 into the machine, this sieve 23 simply is slid into the upper cleaning shoe 35 until the forward transverse beam 92 thereof is received in the seat 95 of said cleaning shoe 35 and whereby the leaf spring 111 automatically engages the roller bearing 88 on the coupling linkage 81. If, on assembly of the upper sieve 23, the roller bearing 88 and the seat 112 in the leaf spring 111 are not aligned with respect to each other, then the leaf spring 111 simply is deflected towards the coupling bar by the roller bearing 88 as the assembly movement takes place. When subsequently the sieve sections 94 are pivoted or otherwise the coupling linkage 81 is caused to pivot e.g. during operation of the combine harvester in hilly conditions, the roller bearing 88 will automatically find the coupling seat 112 in the leaf spring 111 and this seat 112 automatically will spring into engagement with the roller bearing 88 when alignment therebetween is achieved.

However, preferably the electric circuitry of the linear actuator 51 also comprises an overriding switch 127 which, upon actuation, energizes the actuator 51 to cause pivotal movement of the coupling linkage 81 whereby it thus is possible for the operator to cause the roller bearing 88 to find and snap into the coupling seat 112 of the leaf spring 111 immediatly after the sieve 23 is installed in the machine.

This overriding switch 127 may also be useful for facilitating the initial setting of the various components in the central or "neutral" position. When making this initial setting, it normally is necessary to accurately adjust the length of the feedback linkage 77 as well as to accurately adjust the fixation point of the leafspring 111 to the coupling bar 104. To this end, the override switch 127 preferably is positioned adjacent the rear end of the cleaning apparatus 21.

With reference to FIG. 14 the electric circuitry 71 now will be described in greater detail. As illustrated therein, this circuitry comprises a central control circuitry 120 which may include a micro-processor circuitry. Power is supplied to this control circuitry 120 via 122. An electrical bypass circuitry 123 is provided between the control circuitry 120 and the actuator 51 for switching off the power supply to the actuator 51 when the latter becomes overloaded, i.e. when the actuator 51 takes too much electric current (e.g. due to anyone of the dividers being prevented to move). This bypass circuitry controls an alarm 124 and can be reset via 125.

other associated components. Also the conventional cleaning sieve is replaced by the self-levelling cleaning sieve 23 described hereabove. This is easily done, as already explained.

Assuming the harvester is operated in hilly conditions in "small grains", the dividers 41 are coupled to the shuttle member 53 by inserting the coupling pin 65 through the holes in the shuttle member 53 and the coupling bar 54. During operation, any lateral inclination of the harvester is detected by the inclinometer 75 and an output signal is generated thereby which energizes the actuator 51 for shifting the shuttle member 53 in the one or other transverse direction. The dividers 41 thus also are pivoted around their respective pivots 42 in unison. The arrangement is such that these dividers 41 deviate from their "neutral" position in a manner so that their forward ends are shifted sidewards toward the lower side and their rearward ends are shifted sidewards toward the upper side. This tends to compensate for the uneven grain pan loading resulting from the operation with the machine laterally inclined to the extent that these dividers 41 tend to shift the crop material transversely toward the higher side as it progresses along the length of the grain pan 22 toward the cleaning sieve 23. In other words, the angled position of the dividers 41 tends to shift crop material in the transverse direction opposite to the deviation of the flow of crop material induced by the lateral inclination of the machine.

This compensating action by the angled dividers 41 already greatly reduces the adverse influences of operation under hilly conditions on the cleaning process. Actually the cleaning capacity of the cleaning apparatus 21 including the above-described, angularly adjustable dividers may be increased, dependent upon the degree of lateral machine inclination, with up to 35% when compared to a cleaning apparatus having a standard or "fixed" grain pan.

Should any one of the dividers 41 be prevented from pivoting by any possible cause, such as a foreign object being pinched between a divider 41 and the grain pan floor 37, then the electrical bypass device in the power supply line to the actuator 51 will cut the power supply to said actuator 51 to thereby protect the various components against damage. When this occurs, a warning buzzer and/or light alerts the operator who then has to remove the cause of the overloading and whereafter the system can be reset in a conventional manner.

Should the lateral inclination exceed a certain limit then, a corresponding one of the end-of-stroke switches 126 will be operated by the shuttle member 53 whereby, again, the power supply to the actuator 51 is interrupted to avoid damage. However, in this case the system automatically resets itself as soon as the inclinometer 75 detects a subsequent change in the lateral inclination requiring an adjustment of the shuttle member 53 in the other direction.

Should the combine harvester be operated under adverse crop conditions whereby dirt and/or crop material tends to accumulate on and stick to the grain pan surface 37, then pivotal movement of the dividers 41 as a result of the varying lateral orientation of the combine harvester will have a grain pan cleaning effect. Indeed the dividers 41 will scrape across sections of the grain pan surface 37 thus loosening part of the accumulated dirt and/or crop material and which subsequently is conveyed rearwardly toward the cleaning sieves from where it normally is discharged from the machine.

So far only the operation of the grain pan 22 has been described. However, it will be clear from what precedes that, when the self-levelling sieve 23 is installed in the upper cleaning shoe 35, the sieve sections 94 thereof are adjusted in unison with the angular adjustment of the grain pan dividers 41 when the lateral attitude of the combine harvester varies. Indeed any lateral displacement of the shuttle member 53 is translated into a pivotal movement of the sieve sections 94 around respective fore-and-aft axes via the coupling linkage 81 and the bypass coupling 89. The arrangement is such that these sieve sections always tend to return to the level position (as seen transversely of the machine). This self-levelling action of the sieve sections 94, to a very great extent, obviates the tendency of crop material shifting to one side as it progresses along the length thereof during the cleaning operation and thus, the cleaning efficiency and cleaning capacity of the cleaning apparatus 21 are increased accordingly while that the grainlosses also are reduced to a great extent.

It nevertheless has been experienced that, when the combine harvester is operated on a transverse slope with the sieve sections 94 perfectly levelled in a manner as described above, there nevertheless still is a slight tendency for crop material to shift toward the sides of the sieve sections 94 which have been raised. The reason therefore is that, while the sieve sections 94 have been levelled, they still are shaken or reciprocated at an angle to the vertical fore-and-aft plane because the arms (not shown) which participate in effecting that oscillation are still inclined in the same direction relative to that vertical fore-and-aft plane.

Accordingly, as the sieve sections 94 are oscillated, crop material still is thrown to the side of the machine which is lowermost. To overcome this, the sieve sections 94 are slightly over-compensated for the lateral incline to which the combine harvester is subjected at any given instant, whereby these sieve sections 94 are not returned to the strict transversely level position, but instead to a position a few degrees beyond that level position, i.e. inclined a few degrees oppositely to the lateral inclination of the machine. The greater the lateral inclination of the machine, the greater this angle of extra compensation of the sieve sections 94 should be. Preferable, this over-compensation of the upper sieve 23 is in accordance with the formula $R^O = -1.3 \times X^O$ wherein $R^O$ is the angular rotation of the sieve sections 94 and $X^O$ is the lateral inclination of the machine. With this over-compensation, the crop material on the sieve surface is thrown or shaken in the true longitudinal direction of the sieve sections 94.

With this combined automatic adjustment of the grain pan dividers 41 and the sieve sections 94 in response to any variation in the lateral attitude of the combine harvester, the adverse effects of operation of the combine harvester on transverse slopes are substantially eliminated. Thus, this greatly improves the cleaning efficiency and cleaning capacity of the cleaning apparatus and correspondingly also greatly reduces the grain losses under these operating conditions. This automatic adjustment of both the grain pan dividers 41 and the sieve sections 94 has proved to be particularly advantageous when harvesting so-called "small grains".

However, when harvesting corn, often another problem has to be faced. Indeed, corn often is harvested under adverse weather conditions whereby large amounts of dirt sometimes tend to accumulate on and stick to the grain pan surface 37. As already explained, angular adjustment of the dividers 41 has a cleaning effect on the grain pan surface 37, whereby, at least a portion or this accumulated dirt thus can be removed. However, under certain conditions (e.g. when for a long period of time the dividers 41 have not been activated), this accumulation of dirt may be such that it actually prevents any angular displacement of the dividers 41. As already explained, under these circumstances the electrical bypass circuitry will cut the power supply to the actuator 51 to avoid damage. If this automatic switching off of the automatic compensation system were to occur too frequently, this would become impractical. Furthermore, there also is the situation where the dividers 41 may be frozen onto the grain pan surface 37 whereby the automatic system would permanently be made inoperative.

It has been remarked that, for harvesting corn under hilly conditions, an automatic self-levelling of the sieve sections 94 often is sufficient to eliminate all or most of the adverse effects of operation of the harvester on lateral slopes. Accordingly, as for harvesting corn on lateral slopes, angular adjustment of the dividers often is not really needed or such angular adjustment is too problematic for practical use, the dividers 41 preferably are disconnected from the shuttle member 53 and fixed in their "neutral" position to the grain pan 22 by means of the coupling pin 65 coupling the coupling bar 54 to the grain pan beam 39. With this setting of the automatic compensation system, only the sieve sections 94 are adjusted automatically in response to the varying lateral inclination of the harvester during operation.

The advantages of the bypass coupling 89 between the position control means 50 and the self-levelling sieve 23 have already been explained. This bypass coupling 89 is particulary useful when harvesting corn, as, when harvesting this crop, the chances for any piece of crop material obstructing the self-levelling of any sieve section are real. This bypass coupling both avoids damage being caused when such an obstruction occurs and is effective to assist in clearing the obstructing piece as already explained. The bypass coupling 89 is also particulary useful for facilitating the interchanging of the upper cleaning sieve 23, again as already explained.

The positioning of the pivots 42 of the dividers 41 substantially at the two thirds of the fore-and-aft length of the grain pan 22 is advantageous for two reasons. Firstly, it will be appreciated that by this relative positioning of the divider pivots 42, the forward ends of the dividers 41, during operation, are shifted transversely over a substantial width. This is precisely at the location where most of the crop material is received on the grain pan 22 and thus, where any transverse adjustment of the dividers 41 has the greatest effect on the distribution of the crop material across the width of the grain pan, i.e. where it thus is most sensible and practical to take corrective action to redistribute crop material across the width of the cleaning apparatus 21. Indeed, as indicated before, crop material tends to accumulate at the lowermost side of the grainpan 22, thus moving away from the uppermost side of said grain pan 22. As the divider 41 adjacent the lowermost side of the grain pan 22 is shifted at its forward end toward this lowermost side, the grain pan section between said divider 41 and the corresponding grain pan side is substantially reduced in width, whereby the amount of crop material received on this section is reduced accordingly due to the fact that a lot of crop material, which otherwise would have been received on this lowermost section, now is received on the next adjacent grain pan section defined between the lowermost pair of dividers 41.

Similarly, though in just the opposite way, crop material received at the pair of uppermost grain pan sections is also redistributed. Indeed, the lateral inclination of the machine results in the crop material falling away from the uppermost grain pan side. This is compensated by the adjacent, uppermost divider 41 having its forward end moved away from the uppermost grain pan side whereby the uppermost grain pan section obtains a larger width at its forward end for thereby collecting more crop material thereon. Indeed, some of the crop material which otherwise would have been received on the adjacent (second from above) grainpan section defined by the uppermost pair of dividers 41, now is received on the uppermost grain pan section.

Turning now to the rearward ends of the dividers 41, the other advantage of the relative positioning of the divider pivots 42 also will be appreciated. When the harvester is operated on level ground, the grain pan dividers 41 and the cleaning sieve dividers are aligned with respect to each other. Operation of the combine harvester on transverse slopes results, as already explained and when the cleaning sieve is not adjusted, in a tendency of crop material on the respective sieve sections to accumulate adjacent the lowermost one of each pair of sieve dividers defining said respective sieve sections therebetween. This tendency efficiently is opposed by the rearward ends of the grain pan dividers which are shifted transversely relative to the sieve dividers in the direction toward the raised side of the cleaning apparatus 21, so that crop material is discharged by the grain pan sections in cooperation with the grain pan dividers towards the lowered sides of the respective corresponding sieve sections, i.e. the sieve section sides which have been pivioted downwardly as a result of the lateral inclination of the combine harvester. While the positioning of the grain pan divider pivots 42, as described above, is preferred, it will be appreciated that these divider pivots also may be positioned even further to the rear of the grain pan 22.

In summary, it will be seen that in operation of a combine harvester in accordance with the present invention, the inclinometer 75 senses the lateral inclination of the machine and produces an output signal representative thereof which is used to control the linear actuator 51. This actuator 51 is then operated accordingly and this moves the upper sieve sections 94 and, if the grain pan dividers 41 are coupled to the actuator 51, this also moves said dividers 41. Accordingly, adjustment of the cleaning mechanism is automatically effected as the lateral inclination of the machine changes so as to optimise the operation of this cleaning mechanism. The present invention thus provides a relatively simple but extremely efficient cleaning mechanism for a combine harvester and which gives rise to a very significant increase in the capacity of the machine when harvesting on lateral slopes.

It will be understood that changes in the details, materials, steps and arrangements of parts, which have been described and illustrated to explain the nature of the invention, will occur to and may be made by those skilled in the art upon a reading of this disclosure within the principles and scope of the invention.

As an example, the coupling linkage 81 may be eliminated and replaced by one of the dividers 41 on the grain pan 22 also acting as a linkage mechanism between the position control means 50 and the sieve sections 94 for transmitting the adjustment power to said sieve sections 94. In this arrangement, the dividers 41 and sieve sections 94 obviously always are adjusted in unison, i.e. the dividers 41 cannot be disconnected from the position control means 50 while maintaining the coupling between the position control means 50 and the sieve sections 94.

Also, the art and the type of the actuator 51 used in the position control means 50 can be varied as required. For example, instead of the linear actuator 51 illustrated in the drawings, a rotary actuator such as an electric motor may be employed. However, the mounting of the actuator 51 on the grain pan itself is a significant advance in the art. Furthermore, the sieve sections 94 of the upper sieve also can be driven from a separate actuator controlled by the inclinometer 75 also controlling the actuation of the actuator 51 coupled to the dividers 41. Also the lower sieve can be made of the self-levelling type.

Having thus described the invention, what is claimed is:

1. A combine harvester comprising:
    a mobile frame adapted for movement over a field, threshing and separating means supported on said frame to harvest crop material and produce a threshed and separated crop material;
    a cleaning mechanism disposed on said frame to receive said threshed and separated crop material from said threshing and separating means, said cleaning mechanism including a grain pan reciprocated in a fore-and-aft direction and having movable divider means and being operable to receive said threshed and separated crop material, sieve means operable to receive said threshed and separated crop material from said grain pan, and fan means operable to blow cleaning air through said sieve means to clean unwanted debris therefrom;
    inclination sensing means for sensing the lateral inclination of said frame and operable to produce an output indicative of said lateral inclination; and
    position control means mounted on said grain pan for movement therewith and being operable to movably adjust said divider means in response to the output of said inclination sensing means, said position control means including a linear actuator positioned beneath the grain pan and pivotally coupled at one end to a mounting support on the grain pan and operatively connected at an opposing end thereof to the divider means, said position control means further including a shuttle member guided for back-and-forth movement in a transverse direction relative to the grain pan and coupled to the linear actuator, said divider means being selectively connectable to the shuttle member for permitting the linear actuator to control the position of said divider means through the intermediary of said shuttle member and to the grain pan for fixing said divider means in a fixed position relative to said grain pan.

2. The combine harvester of claim 1 wherein said grain pan divider means comprises a plurality of generally fore-and-aft extending, substantially vertical slats pivotally mounted on the grain pan and interconnected at a distance from the respective pivotal mountings by a first coupling bar, which is operatively connectable to the shuttle member.

3. The combine harvester of claim 2 wherein the first coupling bar extends generally transversely beneath the grain pan and is pivotally coupled at spaced apart intervals to the respective divider slats through the intermediary of pivot pins extending through transversely oriented, elongated slots in the grain pan, the shuttle member being guided between said first coupling bar and the grain pan, the first coupling bar being selectively connectable to said shuttle member for movement in unison therewith and to the grain pan for fixing the divider slats in fixed positions relative to the grain pan, the first coupling bar being selectively connectable to said shuttle member for movement in unison therewith and to the grain pan for fixing the divider slats in fixed positions relative to the grain pan.

4. The combine harvester of claim 3 wherein a sealing bar is provided for sealing the elongated slats in the grain pan surface, said sealing bar extending parallel to the coupling bar and being positioned between the divider slats and the grain pan, said sealing bar further having circular apertures at spaced apart intervals for receiving the respective pivot pins therethrough, said sealing bar being movable in unison with the pivot pins and the coupling bar in the transverse direction.

5. The combine harvester of claim 4 wherein spacers are provided between the coupling bar and the shuttle member; between the shuttle member and the grain pan; between the grain pan and the sealing bar; and between the sealing bar and the respective divider slats.

6. The combine harvester of claim 4 wherein the grain pan divider slats are pivotally mounted on the grain pan adjacent the rear end of the grain pan and are actuated adjacent the forward end of the grain pan.

7. The combine harvester of claim 6 wherein the grain pan divider slats extend beyond the rear edge of the grain pan.

8. The combine harvester of claim 1 wherein the lateral inclination sensing means is in the form of an inclinometer of the pendulous type.

9. The combine harvester of claim 8 wherein the lateral inclination sensing means and the position control means are connected to each other in a closed loop manner whereby the position control means supplies a feedback signal to the sensing means.

10. The combine harvester according to claim 9 wherein a feedback coupling between the position control means and the lateral inclination sensing means comprises a coupling rod extending between the shuttle member and said inclination sensing means.

11. The combine harvester of claim 10 wherein the feedback coupling between the lateral inclination sensing means and the position control means includes shock absorbing elastic elements.

12. The combine harvester of claim 10 wherein the feedback coupling rod between the shuttle member and the sensing means, when seen in a transverse direction, is oriented generally perpendicularly to the direction of the oscillatory movement of the grain pan.

13. The combine harvester of claim 8 wherein the sieve means are adjustably mounted in a manner to be maintained substantially horizontal as seen in a transverse direction of the harvester when the latter is laterally inclined during operation.

14. The combine harvester of claim 13 wherein the sieve means comprise an upper sieve and a lower sieve, the upper sieve including a plurality of interconnected sections extending fore-and-aft of the harvester and being pivotable about fore-and-aft extending axes, said sieve sections being actuated so as to be maintained substantially horizontal as seen in the transverse direction of the harvester when the latter is laterally inclined during operation.

15. The combine harvester of claim 14 wherein the upper sieve includes a generally rectangular main frame mounted for generally fore-and-aft oscillatory movement relative to the frame of said combine harvester, each sieve section being formed by a generally rectangular, generally fore-and-aft extending sub-frame mounted on the sieve main frame for pivotal movement around a corresponding one of said fore-and-aft axes, each sieve section further including a plurality of overlapping, transversely extending louvres adjustable independently of the louvres of the other sieve sections, the sieve sections being interconnected via a second coupling bar to which a lug, secured to each individual sub-frame, is pivotally coupled.

16. The combine harvester of claim 15 wherein the junctions between adjacent sieve sections and between the sieve sections and the sieve main frame are sealed by flexible strips attached to the subframe, said flexible strips extending the full length of said sieve sections to seal said junctions and form sieve divider means.

17. The combine harvester of claim 16 wherein the inclination sensing means, which is operable to control the adjustment of the grain pan divider means, also operably controls the leveling movement of said upper sieve sections in response to any lateral inclination of the harvester through the operation of said position control means, maintaining said upper sieve sections substantially transversely horizontal when the combine harvester is laterally inclined.

18. The combine harvester of claim 17 wherein a mechanical coupling system is provided between the position control means and the upper sieve sections such that when the position control means is actuated by an output from the inclination sensing means to adjust the position of the grain pan divider means, the upper sieve sections are also adjusted so as to maintain said upper sieve sections substantially transversely horizontally.

19. The combine harvester of claim 18 wherein the mechanical coupling system is arranged to over-compensate the upper sieve sections so that, for any given lateral inclination of the harvester, said upper sieve sections are adjusted beyond the transversely level position to assume a position laterally inclined oppositely to said given lateral inclination of the harvester.

20. The combine harvester of claim 19 wherein the angle of lateral inclination of said upper sieve sections is approximately 30 percent of the angle of lateral inclination of the combine harvester.

21. The combine harvester of claim 19 wherein the mechanical coupling system includes a safety coupling means operable, when the leveling movement of said upper sieve sections is prevented, to automatically prevent the pivotal movement of said upper sieve sections.

22. The combine harvester of claim 19 wherein a link is pivotally connected intermediate its ends to the grain pan, the link being pivotally coupled at one end to the shuttle member and the opposing end with said coupling member, such that, when the shuttle member is operatively coupled to the grain pan divider means, operation of the position control means in response to the output signal of the inclination sensing means causes both the grain pan divider means and the upper sieve sections to move to the respective required positions to compensate for any given lateral inclination of the harvester, and such that, when the grain pan divider means are disconnected from the shuttle member, operation of the position control means in response to the output signal of the inclination sensing means causes only the upper sieve sections to move to the required positions to compensate for any given lateral inclination of the harvester.

23. The combine harvester of claim 1 wherein said position control means is coupled to a central control circuitry including a time delay, said central control circuitry receiving input signals from said inclination sensing means, a header position sensor signalling when the header is in the raised position, and a cleaning mechanism drive sensor signalling when the cleaning mechanism is running, said central control circuitry being programmed to generate an output signal which causes the position control means to move the grain pan divider means through a full cycle of movement whenever the header is in the raised position, a predetermined period of time has expired since the header has been moved to the raised position, and the cleaning mechanism is running.

* * * * *